US012657833B2

(12) United States Patent
Li et al.

(10) Patent No.: US 12,657,833 B2
(45) Date of Patent: Jun. 16, 2026

(54) STYLIZED IMAGE GENERATION METHOD AND APPARATUS, ELECTRONIC DEVICE AND STORAGE MEDIUM

(71) Applicant: Beijing Zitiao Network Technology Co., Ltd., Beijing (CN)

(72) Inventors: Wenyue Li, Beijing (CN); Caijin Zhou, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 148 days.

(21) Appl. No.: 18/832,859

(22) PCT Filed: Jan. 17, 2023

(86) PCT No.: PCT/CN2023/072539
§ 371 (c)(1),
(2) Date: Jul. 24, 2024

(87) PCT Pub. No.: WO2023/138560
PCT Pub. Date: Jul. 27, 2023

(65) Prior Publication Data
US 2025/0173971 A1 May 29, 2025

(30) Foreign Application Priority Data
Jan. 24, 2022 (CN) .......................... 202210080456.8

(51) Int. Cl.
*G06T 19/00* (2011.01)

(52) U.S. Cl.
CPC .................................... *G06T 19/00* (2013.01)

(58) Field of Classification Search
None
See application file for complete search history.

(56) References Cited

U.S. PATENT DOCUMENTS 8,437,514 B2 * 5/2013 Wen ..................... G06V 40/168
382/165
10,489,683 B1 * 11/2019 Koh ....................... G06N 20/20
(Continued)

FOREIGN PATENT DOCUMENTS

| CN | 113409342 A | 9/2021 |
| CN | 113658324 A | 11/2021 |
| CN | 114419300 A | 4/2022 |

OTHER PUBLICATIONS

ISA China National Intellectual Property Administration, International Search Report Issued in Application No. PCT/CN2023/072539, Mar. 21, 2023, WIPO, 3 pages.

*Primary Examiner* — Jason A Pringle-Parker
(74) *Attorney, Agent, or Firm* — Alleman Hall LLP

(57) ABSTRACT

Embodiments of the present disclosure provide a stylized image generation method and apparatus, an electronic device, and a storage medium. The method comprises: determining a plurality of initial pairing data, and performing training on the basis of the initial pairing data to obtain a style model to be used; determining, on the basis of a preset screening condition, original images to be processed from original images, and processing, on the basis of said style model, each original image to be processed to obtain a style image to be used; performing deformation processing on the style image to be used to obtain a target style image, and taking each original image to be processed and the target style image corresponding thereto as stylized pairing data; and training, on the basis of the stylized pairing data, a stylized conversion model to be trained to obtain a target stylized conversion model.

19 Claims, 3 Drawing Sheets

Original image

Image output by a style model to be used

Image output by a target stylization conversion model

(56) References Cited

U.S. PATENT DOCUMENTS

| | | | | |
|---|---|---|---|---|
| 11,720,994 | B2 * | 8/2023 | Luo ...................... | G06N 3/0464 |
| | | | | 345/648 |
| 2011/0098056 | A1 * | 4/2011 | Rhoads ................. | G01C 21/36 |
| | | | | 345/173 |
| 2018/0373999 | A1 | 12/2018 | Xu | |
| 2019/0340419 | A1 * | 11/2019 | Milman ................. | G06T 15/02 |
| 2023/0130535 | A1 * | 4/2023 | Ma .......................... | G06T 13/40 |
| | | | | 345/474 |
| 2023/0164298 | A1 * | 5/2023 | Khot ....................... | H04N 7/15 |
| | | | | 348/14.08 |

* cited by examiner

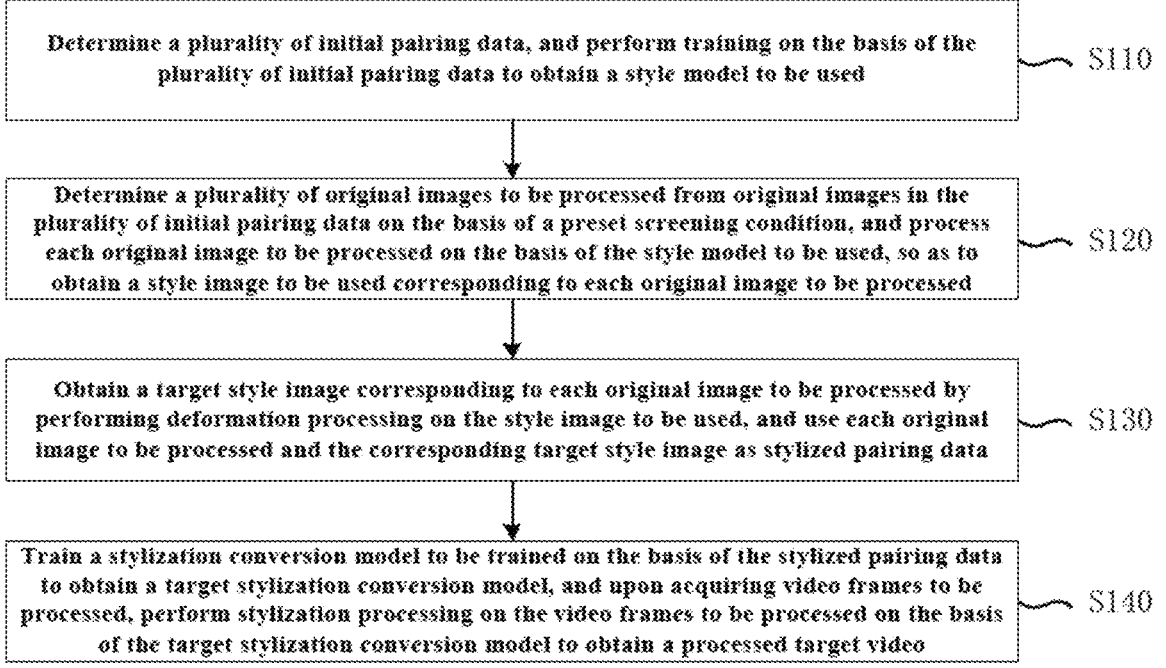

Determine a plurality of initial pairing data, and perform training on the basis of the plurality of initial pairing data to obtain a style model to be used — S110

Determine a plurality of original images to be processed from original images in the plurality of initial pairing data on the basis of a preset screening condition, and process each original image to be processed on the basis of the style model to be used, so as to obtain a style image to be used corresponding to each original image to be processed — S120

Obtain a target style image corresponding to each original image to be processed by performing deformation processing on the style image to be used, and use each original image to be processed and the corresponding target style image as stylized pairing data — S130

Train a stylization conversion model to be trained on the basis of the stylized pairing data to obtain a target stylization conversion model, and upon acquiring video frames to be processed, perform stylization processing on the video frames to be processed on the basis of the target stylization conversion model to obtain a processed target video — S140

FIG. 1

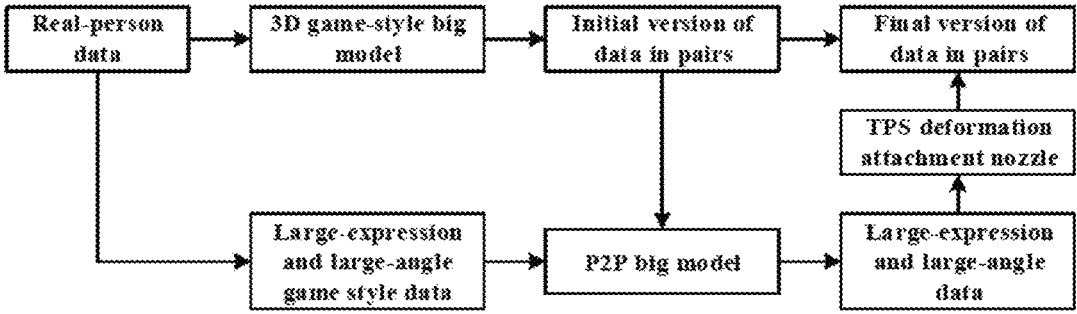

Real-person data → 3D game-style big model → Initial version of data in pairs → Final version of data in pairs Real-person data → Large-expression and large-angle game style data → P2P big model → Large-expression and large-angle data → TPS deformation attachment nozzle → Final version of data in pairs

FIG. 2

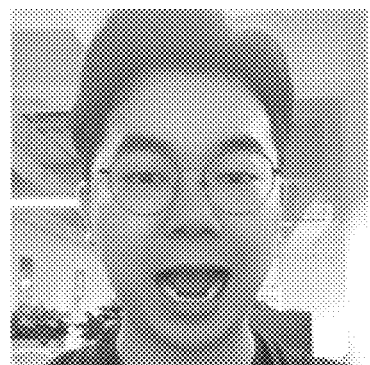
Original image
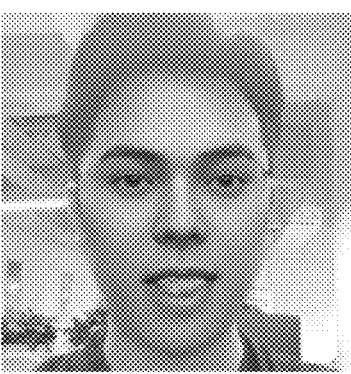
Image output by a style
model to be used
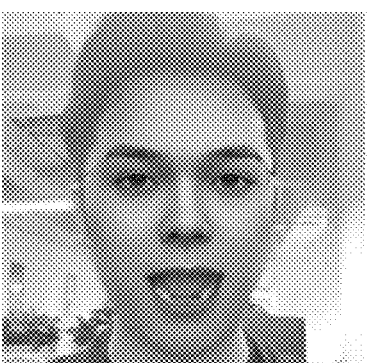
Image output by a target
stylization conversion model
FIG. 3
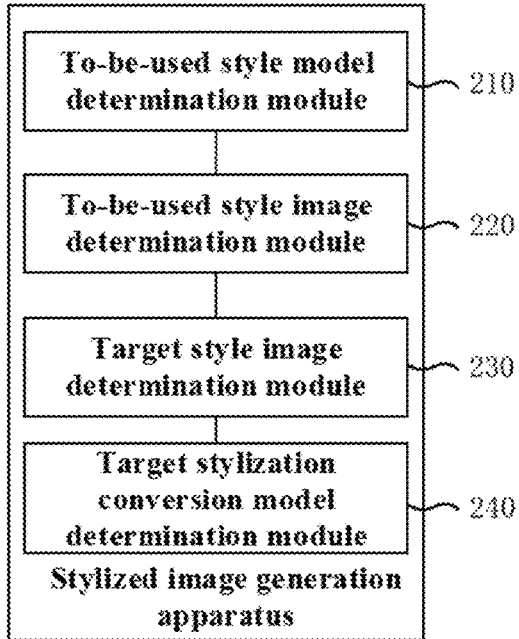
FIG. 4

STYLIZED IMAGE GENERATION METHOD AND APPARATUS, ELECTRONIC DEVICE AND STORAGE MEDIUM

CROSS-REFERENCE TO RELATED APPLICATION(S)

The present disclosure is a national stage application filed under 35 U.S.C. 371 based on International Patent Application No. PCT/CN2023/072539, filed Jan. 17, 2023, which claims the priority to Chinese Application No. 202210080456.8, filed in the China Patent Office on Jan. 24, 2022, and the disclosures of which are incorporated herein by reference in their entireties.

FIELD

Embodiments of the present disclosure relate to the technical field of image processing, for example, to a stylized image generation method and apparatus, an electronic device and a storage medium.

BACKGROUND

With the continuous development of image processing technologies, a user may process an image by using a plurality of applications, so that the processed image presents a desired style type of the user.

In the related art, after the image is processed by related algorithms deployed in a server, although an image of a corresponding style type is obtained, the process of the server receiving the image, processing the image and then feeding back a processing result brings a longer delay, and related algorithms with greater requirements for computing resources cannot be directly deployed in a client; and meanwhile, there may be flaws in the obtained image, for example, some features in the image cannot correspond to the features in the original image, which leads to a poor image processing effect of the algorithms, thereby reducing the usage experience of the user.

SUMMARY

Embodiments of the present disclosure provide a stylized image generation method and apparatus, an electronic device and a storage medium, which improve the pairing property of training data and shorten a stylized image processing delay.

In a first aspect, an embodiment of the present disclosure provides a stylized image generation method, including:

determining a plurality of initial pairing data, and performing training on the basis of the plurality of initial pairing data, so as to obtain a style model to be used, wherein each initial pairing data includes an original image and an initial style image obtained after the original image is processed by a 3D style generation model;

determining a plurality of original images to be processed from the original images in the plurality of initial pairing data on the basis of a preset screening condition, and processing each original image to be processed on the basis of the style model to be used, so as to obtain a style image to be used corresponding to each original image to be processed;

performing deformation processing on the style image to be used, so as to obtain a target style image corresponding to each original image to be processed, and using each original image to be processed and the corresponding target style image as stylized pairing data; and training a stylization conversion model to be trained on the basis of the stylized pairing data, so as to obtain a target stylization conversion model, and then, upon acquiring video frames to be processed, performing stylization processing on the to-be-processed video frame on the basis of the target stylization conversion model, so as to obtain a processed target video.

In a second aspect, an embodiment of the present disclosure further provides a stylized image generation apparatus, including:

a to-be-used style model determination module, configured to determine a plurality of initial pairing data, and perform training on the basis of the plurality of initial pairing data, so as to obtain a style model to be used, wherein each initial pairing data includes an original image and an initial style image obtained after the original image is processed by a 3D style generation model;

a to-be-used style image determination module, configured to determine a plurality of original images to be processed from the original images in the plurality of initial pairing data on the basis of a preset screening condition, and process each original image to be processed on the basis of the style model to be used, so as to obtain a style image to be used corresponding to each original image to be processed;

a target style image determination module, configured to perform deformation processing on the style image to be used, so as to obtain a target style image corresponding to each original image to be processed, and use each original image to be processed and the corresponding target style image as stylized pairing data; and a target stylization conversion model determination module, configured to train a stylization conversion model to be trained on the basis of the stylized pairing data, so as to obtain a target stylization conversion model, and then, upon acquiring video frames to be processed, perform stylization processing on the video frames to be processed on the basis of the target stylization conversion model, so as to obtain a processed target video.

In a third aspect, an embodiment of the present disclosure further provides an electronic device, including:

a processor; and a storage apparatus, configured to store a program, wherein, when the program is executed by the processor, the processor implements the stylized image generation method provided in any embodiment of the present disclosure.

In a fourth aspect, an embodiment of the present disclosure further provides a storage medium, including a computer-executable instruction, wherein the computer-executable instruction is used for, when being executed by a computer processor, executing the stylized image generation method provided in any embodiment of the present disclosure.

BRIEF DESCRIPTION OF THE DRAWINGS

The above and other features, advantages and aspects of various embodiments of the present disclosure will become more apparent in combination with the drawings and with reference to the following detailed description. Throughout the drawings, the same or similar reference signs represent the same or similar elements. It should be understood that the drawings are schematic, and components and elements are not necessarily drawn to scale.

FIG. 1 is a schematic flowchart of a stylized image generation method provided in Embodiment 1 of the present disclosure;

FIG. 2 is a schematic diagram of generating stylized pairing data provided in Embodiment 1 of the present disclosure;

FIG. 3 is an example of an original image, a style image to be used and a target style image provided in Embodiment 1 of the present disclosure;

FIG. 4 is a structural block diagram of a stylized image generation apparatus provided in Embodiment 2 of the present disclosure.

DETAILED DESCRIPTION OF EMBODIMENTS

Figure 5:
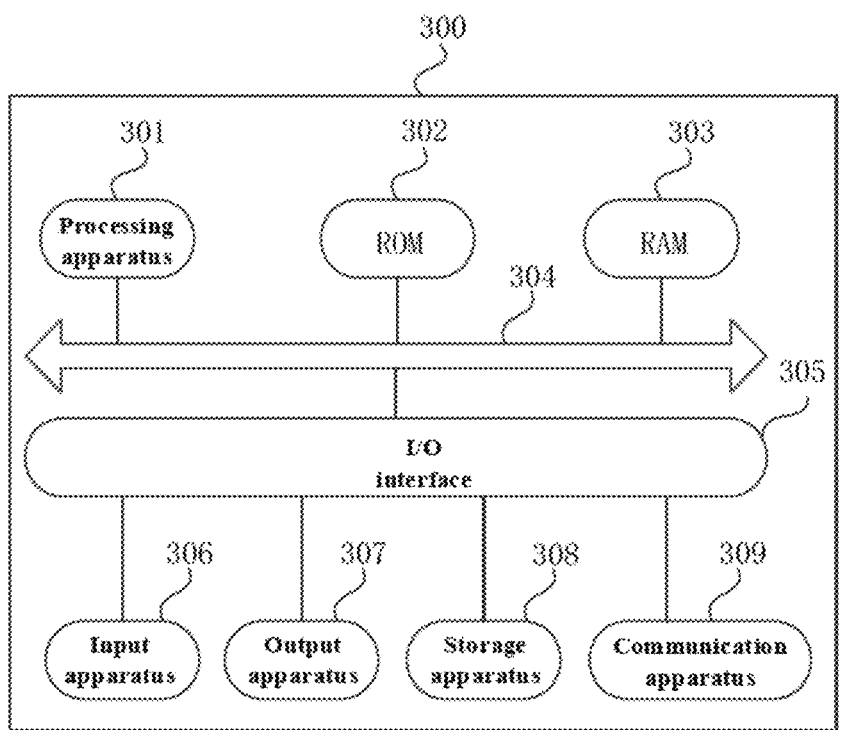
FIG. 5 is a schematic structural diagram of an electronic device provided in Embodiment 3 of the present disclosure.

Hereinafter, embodiments of the present disclosure will be described with reference to the drawings. Although some embodiments of the present disclosure have been illustrated in the drawings, it should be understood that the present disclosure may be implemented in various forms, and these embodiments are provided to help understand the present disclosure more thoroughly and completely. It should be understood that the drawings and embodiments of the present disclosure are for exemplary purposes only.

It should be understood that, various steps recorded in method embodiments of the present disclosure may be executed in different sequences and/or in parallel. In addition, the method embodiments may include additional steps and/or omit executing the steps shown.

As used herein, the terms "include" and variations thereof are open-ended terms, i.e., "including, but not limited to". The term "based on" is "based, at least in part, on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that, concepts such as "first" and "second" mentioned in the present disclosure are only intended to distinguish different apparatuses, modules or units.

It should be noted that, the modifiers of "one" and "more" mentioned in the present disclosure are illustrative, and those skilled in the art should understand that the modifiers should be interpreted as "one or more" unless the context clearly indicates otherwise.

Before the present disclosure is described, an application scenario may be exemplarily described at first. The implementation solution of the present disclosure may be applied to any scenario in which a special effect video needs to be generated, for example, during the process of photographing a video by using a related application, a corresponding pattern may be generated in a display interface on the basis of a drawing operation of a user, so as to generate a special effect video including a three-dimensional model corresponding to the pattern, and the special effect video is displayed in the display interface.

Embodiment 1

FIG. 1 is a schematic flowchart of a stylized image generation method provided in Embodiment 1 of the present disclosure, the present embodiment may be applicable to a case where training data with better matching performance is generated on the basis of an image processing model in the related art, so as to train a model, which is suitable for a mobile terminal and has a better image processing effect, on the basis of the obtained training data, the method may be executed by a stylized image generation apparatus, the apparatus may be implemented in the form of software and/or hardware, and the hardware may be an electronic device, such as a mobile terminal, a personal computer (PC) terminal, a server, or the like. A scenario for displaying a special effect video is usually implemented by the cooperation between a client and a server, and the method provided in the present embodiment may be executed by the server, by the client, or by the cooperation between the client and the server.

As shown in FIG. 1, the method in the present embodiment includes:

S110, determining a plurality of initial pairing data, and performing training on the basis of the plurality of initial pairing data, so as to obtain a style model to be used.

In the present embodiment, an apparatus for executing the stylized image generation method provided in the embodiment of the present disclosure may be integrated in application software that supports a special effect video processing function, and the software may be installed in an electronic device, and optionally, the electronic device may be a mobile terminal or a PC terminal, or the like. The application software may be a type of software for image/video processing, as long as the application software may implement image/video processing. The application software may also be a specially developed application program, which is applied to software for adding a special effect and displaying the special effect, or is integrated in a corresponding page, and the user may process a video frame or a specific image by means of a page integrated in the PC terminal.

Meanwhile, since the application software may be installed and run on the mobile terminal, an algorithm used by the application software to generate a target stylized image should be adapted to the mobile terminal. Exemplarily, with respect to the server, the computing power and computing resources of the mobile terminal are relatively weak, therefore algorithms, which are deployed in the server and have higher requirements for computing power, cannot directly run on the mobile terminal, but it is necessary to retrain a lightweight model, which is adapted to the computing power of the mobile terminal, for a mobile platform, thereby achieving the effect of providing services for the user at a lower delay.

In the present embodiment, in order to obtain a model suitable for the mobile terminal and having a better image processing effect, corresponding training data needs to be generated at first by using a three-dimensional (3-Dimension, 3D) style generation model in the related art. Optionally, a plurality of original images including facial information are acquired; and each original image is input into a pre-trained 3D style generation model to obtain a corresponding initial style image after facial information processing.

In the present embodiment, the 3D style generation model in the related art may be a model, which is deployed in a server and is used for generating the initial style image, and during an actual application process, the 3D style generation model may be a model for generating an image of a 3D game character style type. With regard to the 3D style generation model, the input thereof is an original image including facial features of the user, and it can be understood that the image at least includes features of five sense organs of the user, for example, a life photo or an ID photo of the user; and correspondingly, the output of the model is an image that retains the original features of the five sense organs of the user and meanwhile represents a specific 3D style type on the face of the user, which may be understood as a 3D facial image of a specific style type, and when the model is the model for generating the image of the 3D game character style type, in the output image, a visual effect similar to a role in a game is presented on the face of the user, and under the action of a special effect of the 3D game character style type, the five sense organs on the face are more smooth, clearer and more stereoscopic.

Those skilled in the art should understand that, a training set for training a 3D style generation model may include a plurality of open-source user face images with diversity, for example, include user head portraits of a plurality of genders, a plurality of age groups, a plurality of character expressions and a plurality of visual angles, and these images may be acquired from an open-source image database. In one embodiment, after model training is completed on the basis of the training set, the model may be deployed in a server associated with an application, and details are not described herein again in the present embodiment.

On this basis, each initial pairing data includes an original image and an initial style image obtained after the original image is processed by the 3D style generation model. It can be understood that, during the actual application process, after the original image is processed by the 3D style generation model, the obtained image retains the original facial features of the user, and meanwhile enables the facial image of the user to present the visual effect of the 3D game character style.

In the present embodiment, an image output by the 3D style generation model may only be matched with some features in each original image, for example, parts for reflecting the gender, posture and other features of the user in the two images are matched, but more refined feature parts in the facial image of the user cannot be accurately matched, for example, in the input original image, when the user presents a relatively exaggerated expression, greater facial actions may be generated, and at this time, in the output initial style image, corresponding features may not be accurately matched with the parts where the greater facial actions of the user are generated. Therefore, in order to provide training data with better pairing property for a final model that needs to be trained, a first style model to be trained still needs to be trained on the basis of the initial pairing data, so as to obtain the style model to be used.

In the present embodiment, the first style model to be trained may be a peer to peer (P2P) model deployed in a server, similar to the 3D style generation model, the model may also use, as the input, each original image including facial information, and outputs an image of a specific style type, for example, an image of the 3D game character style type. It can be understood that, on a data basis that the training data (that is, the initial pairing data) already has certain pairing property, an image output by the trained style model to be used has a higher matching degree with the original image. The training process of the first style model to be trained is described below.

Optionally, the first style model to be trained is acquired; for each initial pairing data, an original image in each initial pairing data is used as an input of the first style model to be trained, so as to obtain a first output image corresponding to the original image; a loss value is determined on the basis of the first output image and the initial style image corresponding to the original image, so as to adjust model parameters in the first style model to be trained on the basis of the loss value; and a first loss function in the first style model to be trained is converged as a training target, so as to obtain the style model to be used.

Optionally, after the plurality of initial pairing data are acquired, the large amount of initial pairing data may be processed by using the existing first style model to be trained, so as to generate the first output image, that is, an image having higher matching degrees with the original image input by the user. In one embodiment, after the first output image is obtained, the loss value between the first output image and the initial style image may be determined. When model parameters in the first style model to be trained are corrected by using the loss value, a training error, that is, a loss parameter, of the first loss function in the first style model to be trained may be used as a condition for detecting whether the first loss function reaches convergence, for example, whether the training error is less than a preset error or whether a change trend of the training error tends to be stable, or whether the current number of iterations is equal to a preset number of iterations. If it is detected that a convergence condition is met, for example, the training error of the loss function is less than the preset error, or the change trend of the training error tends to be stable, it indicates that the training of the first style model to be trained is completed, and at this time, iterative training may be stopped. If it is detected that the convergence condition is not met at present, other initial pairing data may be acquired to continue to train the model, until the training error of the loss function is within a preset range. It can be understood that, when the training error of the loss function reaches convergence, the trained style model to be used may be obtained, at this time, after the original image including the facial information of the user is input into the model, an image having a higher matching degree with the original image may be obtained.

S120, determining a plurality of original images to be processed from original images in the plurality of initial pairing data on the basis of a preset screening condition, and processing each original image to be processed on the basis of the style model to be used, so as to obtain a style image to be used corresponding to each original image to be processed.

In the present embodiment, when the style model to be used is a P2P model for generating an image of the 3D game character style type, compared with the initial style image, although the image output by the model has higher matching property with the original image, the overall quality of the output image still has certain difference from that of the original image, for example, the definition of the output image is lower than those of the original image. Therefore, in order to acquire data with higher matching property, a plurality of original images to be processed may be screened out from the original images on the basis of a preset condition, so that the style model to be used only processes the screened images, and the screening process of the original images is described below.

Optionally, the original images in which change angles of parts to be adjusted are greater than preset change angle threshold values in all the original images are determined to be original images to be processed. Exemplarily, the parts to be adjusted include five sense organs, for example, eyes, nose, ears and mouth of the user, the preset change angle threshold values may be change angles set for the five sense organs of the user respectively, for example, included angles between upper and lower contours of the eyes, or angles respectively set for the bending degrees of the mouth. During the actual application process, the angles of the five sense organs of the user may be determined by using related image processing software, and then these angles are compared with the preset change angle threshold values. When it is determined that the angles of the five sense organs are greater than corresponding preset change angle threshold values, the original images may be determined as to be to-be-used original images. During the actual application process, after the to-be-used original images are determined, in order to facilitate the subsequent use of the model, these images may be copied to a specific database, or specific identifiers are marked for these images.

In the present embodiment, when unrelated angles in daily expressions of the user are used as preset change angles, the determined original images to be processed are images in which the expression change amplitudes are at least greater than the change amplitudes of the daily expressions of the user, which may be understood as corresponding facial images when the user generates greater facial actions and when the expressions are relatively exaggerated.

In one embodiment, after the to-be-used original images are obtained by screening, each original image to be processed is input into the style model to be used, so as to obtain a style image to be used corresponding to each original image to be processed. Since the input of the style model to be used is the corresponding facial images when the user generates greater facial actions and when the expressions are relatively exaggerated, there is a difference from the input of the initial 3D style generation model, therefore the outputs corresponding to the two models are also different, which may be understood as that, in the two output images, there are greater differences between features corresponding to the five sense organs of the user.

Exemplarily, after the images in which the user generates greater facial actions are obtained as the to-be-used original images, these images may be input into the P2P model, which is deployed in the server and is used for generating images of the 3D game character style type, for processing so as to obtain images of the 3D game character style type, which have higher matching degrees with the original images.

S130, performing deformation processing on the style image to be used, so as to obtain a target style image corresponding to each original image to be processed, and using each original image to be processed and the corresponding target style image as stylized pairing data.

In the present embodiment, although each obtained style image to be used has a higher matching degree with each to-be-used original image, however features corresponding to the parts where the user generates greater facial actions in the image still cannot be accurately matched with the corresponding parts in the original image, for example, in the to-be-used original image, the corners of the mouth of the user rise in greater amplitudes, in the obtained style image to be used, although the facial image of the user presents the visual effect of the 3D game character style type, the corners of the mouth do not rise in greater amplitudes as that in the corresponding to-be-used original image. Therefore, in order to construct higher-quality training samples for a finally utilized model for providing services for the user, it is still necessary to perform deformation processing on the style image to be used. During the actual application process, the style image to be used may be processed by using a thin plate spline (TPS), wherein the TPS belongs to non-rigid deformation, and the input of the deformation algorithm is matching point pairs of a plurality of groups of identical parts in the two images, for example, matching point pairs of the mouth of the user in the to-be-processed original image and the mouth of the user in the style image to be used, and correspondingly, the output of the deformation algorithm is mapping coordinates of the identical parts in the two images. The process of deformation processing is described below.

Optionally, pixel point information of key points in each original image to be processed and pixel point information of key points in each style image to be used are determined; and deformation parameters is determined on the basis of the pixel point information, so as to attach parts to be adjusted in each original image to be processed into the style image to be used to obtain the target style image.

Since the target of the TPS is to solve a function f, so that $f(P_i)=P_i'(1 \leq i \leq n)$, and a bending energy function is the minimum, at this time, points on the style image to be used may be well corrected by means of interpolation. When the deformation function is used as a process of bending a steel plate, the steel plate passes through n given points, and the energy required for bending the steel plate may be expressed as:

$$E(f) = \int\int \left( \left( \frac{\partial^2 f}{\partial x^2} \right)^2 + 2 \left( \frac{\partial^2 f}{\partial x \partial y} \right)^2 + \left( \frac{\partial^2 f}{\partial y^2} \right)^2 \right) dx dy$$

wherein, (x,y) represents any coordinates of the key points in each original image to be processed.

It can be proved that an interpolation function of TPS is a function with the minimum bending energy:

$$f(x, y) = a_1 + a_2 x + a_3 y + \sum_{i=1}^{n} w_i U(|p_i(x_i, y_i) - p(x, y)|)$$

the mapping from any coordinates (x, y) of the key points in each original image to be processed to any coordinates $(x_i, y_i)$ after deformation may be obtained by means of derivation:

$$\begin{cases} x_i' = a_{1x} + a_{2x} x_i + a_{3x} y_i + \sum_{i=1}^{n} w_{jx} U(|P(x_j, y_j) - P(x_i, y_i)|) \\ y_i' = a_{1y} + a_{2y} x_i + a_{3y} y_i + \sum_{i=1}^{n} w_{jy} U(|P(x_j, y_j) - P(x_i, y_i)|) \end{cases}$$

wherein, w represents a coefficient matrix, and U represents a basis function.

Exemplarily, after each style image to be used is obtained, the pixel point information of the key points in each original image to be processed and the pixel point information of the key points in the style image to be used need to be determined at first, that is, in the two images, pixel point information corresponding to mouth parts with greater rising amplitudes is determined. Optionally, the deformation parameters of the mouth parts is determined on the basis of the above formula, and the mouth parts in the to-be-processed original image are attached to positions corresponding to the mouth parts in the style image to be used on the basis of the deformation parameters, so as to replace original parts, which do not match the actual mouth features of the user, in the style image to be used.

It can be understood that, the style image to be used in which the key points are attached and adjusted is the target style image, the target style image not only retains the unique facial features of the user in the to-be-processed original image, but also enables the image to present the visual effect of the 3D game character style type, and thus having a higher matching degree with the to-be-processed original image.

In the present embodiment, after the target style image is obtained, the target style image may be combined with the corresponding to-be-processed original image, so as to obtain stylized pairing data, wherein the stylized pairing data is data used for training an actually used model of the application, for example, data used for training an image processing model that needs to be deployed in a mobile terminal.

In order to describe the process of determining the stylized pairing data in a more integral manner, this process is described below with reference to FIG. 2.

Referring to FIG. 2, after the original images including the facial information of the user are acquired, the original images may be first processed by using the model, which is deployed in the server and is used for generating the images of the 3D game character style type, so as to combine the processing result with the original images to obtain a primary version of training data in pairs, and a to-be-trained P2P model, which is also used for generating the images of the 3D game character style type, may be trained on the basis of the training data. It can be understood that, after the training of the P2P model is completed, images output by the P2P model have higher pairing property with the original images, but since the overall quality of the output images is lower than that of the original images, it is also necessary to screen out, from the original images, original images to be processed in which the user presents large expressions and large-angle changes occur in some parts on the face, and these original images to be processed are input into the trained P2P model, so as to obtain corresponding style image to be used, that is, images of the 3D game character style type corresponding to the images in which the user presents large expressions and large-angle changes occur in some parts on the face, and in these images, the parts where the large expressions and large-angle changes occur on the face still have differences from corresponding parts in the to-be-used original images.

With continued reference to FIG. 2, in order to improve the pairing property between each style image to be used and the corresponding original image, it is still necessary to perform, on the basis of the TPS technology, deformation on corresponding parts, where the large expressions and large-angle changes occur on the face of the user, in the style image to be used, for example, when the corners of the mouth of the user rise in greater amplitudes in each original image to be processed, corresponding parts in the style image to be used may be deformed on the basis of the TPS technology; after the deformation parameters is obtained, a mouth area in the original image may be attached into the to-be-used image, so as to obtain the target style image with higher pairing property with the to-be-processed original image; and finally, the target style image is combined with the corresponding to-be-processed original image, so as to construct a final version of training data in pairs, and a finally used target stylization conversion model of the application may be trained with the training data with higher pairing property.

It should be noted that, during the actual application process, the image processing model deployed in the mobile terminal may be a lightweight stylization conversion model for generating images of the 3D game character style type; and it can be understood that after an image including the facial information of the user is input to the stylization conversion model for processing, an image of the 3D game character style type, which has a higher matching degree with the facial features of the user, may be trained by using lower computing resources.

Based on the above description, it can be determined that before the stylization conversion model is trained by using the stylized pairing data, a stylization conversion model to be trained of a target grid structure needs to be determined at first; a discriminator to be trained is spliced for the stylization conversion model to be trained, and a parameter adjustment constraint condition is set for the discriminator to be trained to perform constraint adjustment on model parameters in the stylization conversion model to be trained and model parameters in the discriminator to be trained on the basis of the constraint condition, so as to obtain a target stylization conversion model.

During the actual application process, the stylization conversion model to be trained may be a model based on a generative adversarial network (GAN), wherein the generative adversarial network may be associated with a generative network and a discriminative network. The generative network randomly samples from a potential space as an input, and an output result thereof needs to simulate a real sample in the training set as much as possible, and the input of the discriminative network is the real sample and an output of the generative network. Based on this, it can be understood that the stylization conversion model to be trained in the present embodiment may also be spliced with one discriminator to be trained, so that in a subsequent process, the stylization conversion model, which has been subjected to parameter correction, regenerates a target stylized image.

It should be noted that, in order to make the stylization conversion model to be trained adapt to the computing power of the mobile terminal, a plurality of lightweight models, that is, models with fewer network levels and insufficiently refined model parameters, may be developed in advance, and after these models are deployed in the mobile terminal, the original images may be processed. Since these models may generate images with lower signal-to-noise ratios on the basis of fewer numbers of channels, the image processing delay can be shortened. After all the models output processing results corresponding to the original images, on the basis of factors such as image processing effects and model running durations, a model having a better image processing effect and a shorter running time may be screened out from the plurality of models to serve as the stylization conversion model to be trained.

In the present embodiment, a large amount of error data may be easily generated when a common P2P model is trained in the 3D game character style type, this is because the discriminator to be trained is unstable. Therefore, in order to improve the stability of a subsequent model training process, it is also necessary to set the parameter adjustment constraint condition for the discriminator to be trained, for example, spectral norm regularization (SNR), which introduces regular constraints from a spectral norm angle of a parameter matrix of each layer of neural network, so that the neural network has better non-sensitivity to input disturbance, and thus the subsequent training process is more stable and easier to converge.

Optionally, when the parameter adjustment constraint condition set for the discriminator to be trained is the SNR, the discriminator to be trained may meet Lipschitzian continuity in the subsequent training process, that is, $$\frac{f(x) - f(y)}{x - y} \leq K$$

where, K is a constant, and for the function f, the minimum constant K meeting the above condition is a Lipschitz constant. In the present embodiment, the SNR performs singular value decomposition (SVD) on the parameters of each layer of the neural network, and sets the maximum singular value to be 1 after the decomposition, that is, the maximum singular value is divided after network parameters are updated each time, and on this basis, a stretching value of each layer of network in the discriminator does not exceed 1, so that the discriminator to be trained meets the Lipschitzian continuity in the training process, and thus the training process of the discriminator to be trained is more stable and easier to converge.

S140, training the stylization conversion model to be trained on the basis of the stylized pairing data, so as to obtain a target stylization conversion model, and then, upon acquiring video frames to be processed, performing stylization processing on the video frames to be processed on the basis of the target stylization conversion model, so as to obtain a processed target video.

In the present embodiment, the training process of the stylization conversion model to be trained may include: inputting each original image to be processed in the stylized pairing data into the stylization conversion model to be trained, so as to obtain a second actual output image; inputting the second actual output image and the target style image in the stylized pairing data into the discriminator to be trained, so as to obtain a discrimination result; adjusting model parameters in the stylization conversion model to be trained and model parameters in the discriminator to be trained on the basis of the discrimination result and a constraint condition; and converging a loss function in the stylization conversion model to be trained and a loss function in the discriminator to be trained as training targets, so as to obtain the target stylization conversion model.

Optionally, after a plurality of groups of stylized pairing data are acquired, a large amount of stylized pairing data may be processed by using the existing stylization conversion model to be trained, so as to generate the second actual output image, that is, an image having a higher matching degree with each original image input by the user. Exemplarily, after the second actual output image is obtained, a loss value between the second actual output image and the target style image in the stylized pairing data may be determined on the basis of the discriminator to be trained, and it can be understood that the loss value is a discrimination result. When the model parameters in the stylization conversion model to be trained and the model parameters in the discriminator to be trained are corrected by using the loss value under a preset spectral norm regular constraint condition, training errors, that is, loss parameters, of a loss function in the stylization conversion model to be trained and a loss function in the discriminator to be trained may be used as conditions for detecting whether the loss functions reach convergence, for example, whether the training errors are less than a preset error or whether change trends of the training errors tend to be stable, or whether the current number of iterations is equal to a preset number of iterations. If it is detected that a convergence condition is met, for example, the training errors of the loss functions are less than the preset error, or the change trends of the training errors tend to be stable, it indicates that the training of the stylization conversion model to be trained and the discriminator to be trained is completed, and at this time, iterative training may be stopped. If it is detected that the convergence condition is not met at present, other stylized pairing data may be acquired to continue to train the model and the discriminator, until the training errors of the loss functions are within a preset range. It can be understood that, when the training errors of the loss functions reach convergence, a trained target stylization conversion model may be obtained, at this time, after the original images including the facial information of the user are input into the model, it is possible to obtain a visual effect, which not only retains the original facial features of the user, but also presents the 3D game character style type.

It should be noted that, after the target stylization conversion model is obtained, the target stylization conversion model may also be deployed in the client, so that when the video frames to be processed are acquired, stylization processing is performed on the video frames to be processed on the basis of the target stylization conversion model, so as to obtain target video frames, and the target video is obtained on the basis of all the target video frames.

Since the client may be installed in a mobile terminal device of the user, and the mobile terminal device generally has the function of collecting the facial image of the user, after the target stylization conversion model is deployed in the client, and after it is detected that the user triggers a control associated with the generation of the target stylization conversion model, facial information in a video collected by a front camera or a rear camera of the mobile terminal may be recognized, and after the facial information of the user is recognized, a corresponding video clip may be segmented into a plurality of video frames, or, a video, which is manually imported into the application by the user, is directly segmented into a plurality of video frames.

In one embodiment, after a plurality of video frames are acquired, these video frames may be processed on the basis of the target stylization conversion model, so as to obtain target video frames. It can be understood that, when the target stylization conversion model generates the images of the 3D game character style type for the user, in the target video frames, the facial information of the user may also present the visual effect of the 3D game character style type while retaining the original features. Finally, the processed video frames are spliced to obtain the target video, and the target video may be presented to the user by means of displaying the target video in a display interface associated with the application, thereby enhancing the interestingness of video content.

It should be noted that, since the target stylization conversion model obtained by training may be directly deployed in the mobile terminal, when the facial image of the user is processed, the image/video may be directly processed on the mobile terminal, thereby avoiding a tedious process of uploading the image/video to the server, and then receiving a processing result of the server, thus reducing the stagnation and delay when the application software presents the target video to the user, and ensuring smoother playback of videos with target style images, therefore the usage experience of the user is improved.

In the present embodiment, in order to more clearly reflect the difference among the original image, the style image to be used output by the style model to be used and the target style image output by the target stylization conversion model, FIG. 3 may also be used as an example for description.

Referring to FIG. 3, after the user collects an image including facial information by using a camera of a mobile terminal, the image may be used as the original image, that is, a first image including a mouth-opening expression of the user. In one embodiment, the original image is input into the style model to be used that has been trained in the server, so as to obtain a style image to be used of the 3D game character style type, as can be seen from the figure, although the image reflects some facial features of the user on the whole and presents the visual effect of the 3D game character style type, but does not reflect the mouth-opening expression of the user, that is, the situation, in which a part corresponding to the mouth is inconsistent with that in the original image, occurs in the style image to be used.

With continued reference to FIG. 3, after the target stylization conversion model is obtained by means of performing training on the basis of the solution in the present embodiment, and is deployed in the mobile terminal to process the original image, the target style image may be output. As can be seen from the figure, the target style image not only reflects some facial features of the user on the whole as the style image to be used, and presents the visual effect of the 3D game character style type, but also reproduces the mouth-opening expression of the user in the image, so that the output image keeps higher consistency with the original image in terms of key features such as the five sense organs, and thus the problem of a poor matching degree between the image, which is obtained on the basis of the style image to be used, and the original image is solved.

In the present embodiment, a plurality of initial pairing data are determined at first, and training is performed on the basis of the plurality of initial pairing data, so as to obtain a style model to be used; a plurality of original images to be processed are determined from the original images in the plurality of initial pairing data on the basis of a preset screening condition, and each original image to be processed is processed on the basis of the style model to be used, so as to obtain a style image to be used corresponding to each original image to be processed; deformation processing is performed on the style image to be used, so as to obtain a target style image corresponding to each original image to be processed, and each original image to be processed and the corresponding target style image are used as stylized pairing data; and finally, a stylization conversion model to be trained is trained on the basis of the stylized pairing data, so as to obtain a target stylization conversion model, and then, upon acquiring video frames to be processed, stylization processing is performed on the video frames to be processed on the basis of the target stylization conversion model, so as to obtain a processed target video. By means of introducing the style model to be used and performing deformation processing on the style model to be used, the pairing property of the finally obtained training data is improved; and a lightweight model suitable for the mobile terminal is trained on the basis of the training data, thereby avoiding the tedious process of transferring image data between the client and the server, shortening the stylized image processing delay, and improving the usage experience of the user.

Embodiment 2

FIG. 4 is a structural block diagram of a stylized image generation apparatus provided in Embodiment 2 of the present disclosure, and the apparatus may execute the stylized image generation method provided in any embodiment of the present disclosure and has corresponding functional modules and beneficial effects for executing the method. As shown in FIG. 4, the apparatus includes: a to-be-used style model determination module 210, a to-be-used style image determination module 220, a target style image determination module 230 and a target stylization conversion model determination module 240.

The to-be-used style model determination module 210 is configured to determine a plurality of initial pairing data, and perform training on the basis of the plurality of initial pairing data, so as to obtain a style model to be used, wherein each initial pairing data includes an original image and an initial style image obtained after the original image is processed by a 3D style generation model.

The to-be-used style image determination module 220 is configured to determine a plurality of original images to be processed from the original images in the plurality of initial pairing data on the basis of a preset screening condition, and process each original image to be processed on the basis of the style model to be used, so as to obtain a style image to be used corresponding to each original image to be processed.

The target style image determination module 230 is configured to perform deformation processing on the style image to be used, so as to obtain a target style image corresponding to each original image to be processed, and use each original image to be processed and the corresponding target style image as stylized pairing data.

The target stylization conversion model determination module 240 is configured to train a stylization conversion model to be trained on the basis of the stylized pairing data, so as to obtain a target stylization conversion model, and then, upon acquiring video frames to be processed, perform stylization processing on the video frames to be processed on the basis of the target stylization conversion model, so as to obtain a processed target video.

On the basis of the above implementation solutions, the to-be-used style model determination module 210 includes an original image acquisition unit and an initial style image generation unit.

The original image acquisition unit is configured to acquire a plurality of original images including facial information.

The initial style image generation unit is configured to input each original image into a pre-trained 3D style generation model, so as to obtain a corresponding initial style image after facial information processing.

On the basis of the above implementation solutions, the to-be-used style model determination module 210 further includes a to-be-trained style model acquisition unit, a first output image generation unit, a loss value determination unit, and a to-be-used style model determination unit.

The to-be-trained style model acquisition unit is configured to acquire a first style model to be trained.

The first output image generation unit is configured to, for each initial pairing data, use an original image in each initial pairing data as an input of the first style model to be trained, so as to obtain a first output image corresponding to the original image.

The loss value determination unit is configured to determine a loss value on the basis of the first output image and the initial style image corresponding to the original image, so as to adjust model parameters in the first style model to be trained on the basis of the loss value.

The to-be-used style model determination unit is configured to converge a first loss function in the first style model to be trained as a training target, so as to obtain the style model to be used.

On the basis of the above implementation solutions, the preset screening condition includes that change angles of parts to be adjusted are greater than preset change angle threshold values.

Optionally, the to-be-used style image determination module 220 is further configured to determine, to be the original images to be processed, original images in which the change angles of the parts to be adjusted are greater than the preset change angle threshold values in the original images, wherein the parts to be adjusted include five sense organs.

Optionally, the to-be-used style image determination module 220 is further configured to input each original image to be processed into the style model to be used, so as to obtain the style image to be used corresponding to each original image, wherein the style image to be used has different features from the initial style image corresponding to each original image to be processed.

On the basis of the above implementation solutions, the target style image determination module 230 includes a pixel point information determination unit and a target style image generation unit.

The pixel point information determination unit is configured to determine pixel point information of key points in each original image to be processed and key points in the style image to be used.

The target style image generation unit is configured to determine deformation parameters on the basis of the pixel point information, and attach the parts to be adjusted in each original image to be processed into the style image to be used on the basis of the deformation parameters, so as to obtain the target style image.

On the basis of the above implementation solutions, the stylized image generation apparatus further includes a parameter adjustment constraint condition setting module.

The parameter adjustment constraint condition setting module is configured to determine a stylization conversion model to be trained of a target grid structure; and splice a discriminator to be trained for the stylization conversion model to be trained, and set a parameter adjustment constraint condition for the discriminator to be trained to perform constraint adjustment on model parameters in the stylization conversion model to be trained and model parameters in the discriminator to be trained on the basis of the constraint condition, so as to obtain the target stylization conversion model.

On the basis of the above implementation solutions, the target stylization conversion model determination module 240 includes a second actual output image generation unit, a discrimination result generation unit, a parameter adjustment unit, and a target stylization conversion model determination unit.

The second actual output image generation unit is configured to input each original image to be processed in the stylized pairing data into the stylization conversion model to be trained, so as to obtain a second actual output image.

The discrimination result generation unit is configured to input the second actual output image and the target style image in the stylized pairing data into the discriminator to be trained, so as to obtain a discrimination result.

The parameter adjustment unit is configured to adjust model parameters in the stylization conversion model to be trained and model parameters in the discriminator to be trained on the basis of the discrimination result and the constraint condition.

The target stylization conversion model determination unit is configured to converge a loss function in the stylization conversion model to be trained and a loss function in the discriminator to be trained as training targets, so as to obtain the target stylization conversion model.

On the basis of the above implementation solutions, the stylized image generation apparatus further includes a model deployment module.

The model deployment module is configured to deploy the target stylization conversion model in a client, upon acquiring video frames to be processed, perform stylization processing on the video frames to be processed on the basis of the target stylization conversion model, so as to obtain target video frames, and then obtain a target video on the basis of all the target video frames.

In the present embodiment, a plurality of initial pairing data are determined at first, and training is performed on the basis of the plurality of initial pairing data, so as to obtain a style model to be used; a plurality of original images to be processed are determined from the original images in the plurality of initial pairing data on the basis of a preset screening condition, and each original image to be processed is processed on the basis of the style model to be used, so as to obtain a style image to be used corresponding to each original image to be processed; deformation processing is performed on the style image to be used, so as to obtain a target style image corresponding to each original image to be processed, and each original image to be processed and the corresponding target style image are used as stylized pairing data; and finally, a stylization conversion model to be trained is trained on the basis of the stylized pairing data, so as to obtain a target stylization conversion model, and then, upon acquiring video frames to be processed, stylization processing is performed on the video frames to be processed on the basis of the target stylization conversion model, so as to obtain a processed target video. By means of introducing the style model to be used and performing deformation processing on the style model to be used, the pairing property of the finally obtained training data is improved; and a lightweight model suitable for the mobile terminal is trained on the basis of the training data, thereby avoiding the tedious process of transferring image data between the client and the server, shortening the stylized image processing delay, and improving the usage experience of the user.

The stylized image generation apparatus provided in the embodiment of the present disclosure may execute the stylized image generation method provided in any embodiment of the present disclosure, and has corresponding functional modules and beneficial effects for executing the method.

It is worth noting that, various units and modules included in the above apparatus are only divided according to functional logic, as long as corresponding functions may be implemented; and in addition, specific names of various functional units are merely for ease of distinguishing each other.

Embodiment 3

FIG. 5 is a schematic structural diagram of an electronic device provided in Embodiment 3 of the present disclosure. Referring to FIG. 5 below, it illustrates a schematic structural diagram of an electronic device (e.g., a terminal device or a server in FIG. 5) 300 suitable for implementing the embodiment of the present disclosure. The terminal device in the embodiment of the present disclosure may include mobile terminals such as mobile phones, notebook computers, digital broadcast receivers, personal digital assistants (PDAs), portable Android devices (PADs), portable media players (PMPs), vehicle-mounted terminals (e.g., vehicle-mounted navigation terminals), and the like, and fixed terminals such as digital television (TVs), desktop computers, and the like. The electronic device shown in FIG. 5 is merely an example.

As shown in FIG. 5, the electronic device 300 may include a processing apparatus (e.g., a central processing unit, a graphics processing unit, or the like) 301, and the electronic device 300 may execute various suitable actions and processes in accordance with a program stored in a read-only memory (ROM) 302 or a program loaded from a storage apparatus 306 into a random access memory (RAM) 303. In the RAM 303, various programs and data needed by the operations of the electronic device 300 are also stored. The processing apparatus 301, the ROM 302 and the RAM 303 are connected with each other via a bus 304. An input/output (I/O) interface 305 is also connected to the bus 304.

In general, the following apparatuses may be connected to the I/O interface 305: an editing apparatus 306, including, for example, a touch screen, a touch pad, a keyboard, a mouse, a camera, a microphone, an accelerometer, a gyroscope, and the like; an output apparatus 307, including, for example, a liquid crystal display (LCD), a speaker, a vibrator, and the like; a storage apparatus 308, including, for example, a magnetic tape, a hard disk, and the like; and a communication apparatus 309. The communication apparatus 309 may allow the electronic device 300 to communicate in a wireless or wired manner with other devices to exchange data. Although FIG. 5 illustrates the electronic device 300 having various apparatuses, it should be understood that not all illustrated apparatuses are required to be implemented or provided. More or fewer apparatuses may alternatively be implemented or provided.

In particular, according to the embodiment of the present disclosure, the processes described above with reference to the flowcharts may be implemented as computer software programs. For example, the embodiment of the present disclosure includes a computer program product, which includes a computer program carried on a non-transitory computer-readable medium, and the computer program contains program codes for executing the method illustrated in the flowcharts. In such an embodiment, the computer program may be downloaded and installed from a network via the communication apparatus 309, or installed from the storage apparatus 306, or installed from the ROM 302. When the computer program is executed by the processing apparatus 301, the above functions defined in the method of the embodiments of the present disclosure are executed.

The names of messages or information interacted between a plurality of apparatuses in the embodiments of the present disclosure are for illustrative purposes only and are not intended to limit the scope of these messages or information.

The electronic device provided in the embodiment of the present disclosure belongs to the same inventive concept as the stylized image generation method provided in the above embodiments, for technical details that are not described in detail in the present embodiment, reference may be made to the above embodiments, and the present embodiment has the same beneficial effects as the above embodiments.

Embodiment 4

The embodiment of the present disclosure provides a computer storage medium, on which a computer program is stored, wherein the program implements, when being executed by a processor, the stylized image generation method provided in the above embodiments.

It should be noted that, the computer-readable medium described above in the present disclosure may be either a computer-readable signal medium or a computer-readable storage medium, or any combination of the two. The computer-readable storage medium may be, for example, an electrical, magnetic, optical, electromagnetic, infrared, or semiconductor system, apparatus or device, or a combination of any of the above. The computer-readable storage medium may include an electrical connection having one or more wires, a portable computer magnetic disk, a hard disk, a random access memory, a read-only memory, an erasable programmable read-only memory (an EPROM or a flash memory), an optical fiber, a compact disc read-only memory (CD-ROM), an optical storage device, a magnetic storage device, or any suitable combination of the above. In the present disclosure, the computer-readable storage medium may be any tangible medium that contains or stores a program, wherein the program may be used by or in combination with an instruction execution system, apparatus or device. In the present disclosure, the computer-readable signal medium may include a data signal that is propagated in a baseband or used as part of a carrier, wherein the data signal carries computer-readable program codes. Such propagated data signal may take many forms, including electromagnetic signals, optical signals, or any suitable combination thereof. The computer-readable signal medium may also be any computer-readable medium other than the computer-readable storage medium, and the computer-readable signal medium may send, propagate or transport the program for use by or in combination with the instruction execution system, apparatus or device. Program codes contained on the computer-readable medium may be transmitted with any suitable medium, including: an electrical wire, an optical cable, radio frequency (RF), and the like, or any suitable combination thereof.

In some embodiments, a client and a server may perform communication by using any currently known or future-developed network protocol, such as a hypertext transfer protocol (HTTP), and may be interconnected with any form or medium of digital data communication (e.g., a communication network). Examples of the communication network include a local area network (LAN), a wide area network (WAN), an international network (e.g., the Internet), and a peer-to-peer network (e.g., an ad hoc peer-to-peer network), as well as any currently known or future-developed network.

The computer-readable medium may be contained in the above electronic device; and it may also be present separately and is not assembled into the electronic device.

The computer-readable medium carries one or more programs that, when being executed by the electronic device, cause the electronic device to perform the following operations:

determining a plurality of initial pairing data, and performing training on the basis of the plurality of initial pairing data, so as to obtain a style model to be used, wherein each initial pairing data includes an original image and an initial style image obtained after the original image is processed by a 3D style generation model;

determining a plurality of original images to be processed from the original images in the plurality of initial pairing data on the basis of a preset screening condition, and processing each original image to be processed on the basis of the style model to be used, so as to obtain a style image to be used corresponding to each original image to be processed;

performing deformation processing on the style image to be used, so as to obtain a target style image corresponding to each original image to be processed, and using each original image to be processed and the corresponding target style image as stylized pairing data; and training a stylization conversion model to be trained on the basis of the stylized pairing data, so as to obtain a target stylization conversion model, and then, upon acquiring video frames to be processed, performing stylization processing on the video frames to be processed on the basis of the target stylization conversion model, so as to obtain a processed target video.

Computer program codes for executing the operations of the present disclosure may be written in one or more programming languages or combinations thereof. The programming languages include object-oriented programming languages, such as Java, Smalltalk, C++, and conventional procedural programming languages, such as the "C" language or similar programming languages. The program codes may be executed entirely on a user computer, executed partly on the user computer, executed as a stand-alone software package, executed partly on the user computer and partly on a remote computer, or executed entirely on the remote computer or a server. In the case involving the remote computer, the remote computer may be connected to the user computer by means of any type of network, including an LAN or a WAN, or it may be connected to an external computer (e.g., by means of the Internet using an Internet service provider).

The flowcharts and block diagrams in the drawings illustrate the system architectures, functions and operations of possible implementations of systems, methods and computer program products according to various embodiments of the present disclosure. In this regard, each block in the flowcharts or block diagrams may represent a part of a module, a program segment, or a code, which contains one or more executable instructions for implementing specified logical functions. It should also be noted that, in some alternative implementations, the functions annotated in the blocks may occur out of the sequence annotated in the drawings. For example, two blocks shown in succession may, in fact, be executed substantially concurrently, or the blocks may sometimes be executed in a reverse sequence, depending upon the functions involved. It should also be noted that, each block in the block diagrams and/or flowcharts, and combinations of the blocks in the block diagrams and/or flowcharts may be implemented by dedicated hardware-based systems for executing specified functions or operations, or combinations of dedicated hardware and computer instructions.

The units involved in the described embodiments of the present disclosure may be implemented in a software or hardware manner. The names of the units do not constitute limitations of the units themselves in a certain case, for example, a first acquisition unit may also be described as "a unit for acquiring at least two Internet Protocol addresses".

The functions described herein above may be executed, at least in part, by one or more hardware logic components. For example, example types of the hardware logic components that may be used include: a field programmable gate array (FPGA), an application specific integrated circuit (ASIC), application specific standard parts (ASSPs), a system on chip (SOC), a complex programmable logic device (CPLD), and so on.

In the context of the present disclosure, a machine-readable medium may be a tangible medium, which may contain or store a program for use by or in combination with the instruction execution system, apparatus or device. The machine-readable medium may be a machine-readable signal medium or a machine-readable storage medium. The machine-readable medium may include an electrical, magnetic, optical, electromagnetic, infrared, or semiconductor system, apparatus or device, or any suitable combination thereof. The machine-readable storage medium may include an electrical connection based on one or more wires, a portable computer disk, a hard disk, an RAM, an ROM, an erasable programmable read-only memory (EPROM or a flash memory), an optical fiber, a CD-ROM, an optical storage device, a magnetic storage device, or any suitable combination thereof.

According to one or more embodiments of the present disclosure, Example 1 provides a stylized image generation method, including:

determining a plurality of initial pairing data, and performing training on the basis of the plurality of initial pairing data, so as to obtain a style model to be used, wherein each initial pairing data includes an original image and an initial style image obtained after the original image is processed by a 3D style generation model;

determining a plurality of original images to be processed from the original images in the plurality of initial pairing data on the basis of a preset screening condition, and processing each original image to be processed on the basis of the style model to be used, so as to obtain a style image to be used corresponding to each original image to be processed;

performing deformation processing on the style image to be used, so as to obtain a target style image corresponding to each original image to be processed, and using each original image to be processed and the corresponding target style image as stylized pairing data; and training a stylization conversion model to be trained on the basis of the stylized pairing data, so as to obtain a target stylization conversion model, and then, upon acquiring video frames to be processed, performing stylization processing on the video frames to be processed on the basis of the target stylization conversion model, so as to obtain a processed target video.

According to one or more embodiments of the present disclosure, Example 2 provides a stylized image generation method, further including:

optionally, acquiring a plurality of original images including facial information; and inputting each original image into a pre-trained 3D style generation model, so as to obtain a corresponding initial style image after facial information processing.

According to one or more embodiments of the present disclosure, Example 3 provides a stylized image generation method, further including:

optionally, acquiring a first style model to be trained;

for the plurality of initial pairing data, using an original image in each initial pairing data as an input of the first style model to be trained, so as to obtain a first output image corresponding to the original image;

determining a loss value on the basis of the first output image and the initial style image corresponding to the original image, so as to adjust model parameters in the first style model to be trained on the basis of the loss value; and converging a first loss function in the first style model to be trained as a training target, so as to obtain the style model to be used.

According to one or more embodiments of the present disclosure, Example 4 provides a stylized image generation method, further including:

optionally, the preset screening condition includes that change angles of parts to be adjusted are greater than preset change angle threshold values, and the step of determining the plurality of original images to be processed from the original images in the plurality of initial pairing data on the basis of the preset screening condition includes:

determining, to be the original images to be processed, original images in which the change angles of the parts to be adjusted are greater than the preset change angle threshold values in the original images, wherein the parts to be adjusted include five sense organs.

According to one or more embodiments of the present disclosure, Example 5 provides a stylized image generation method, further including:

optionally, inputting each original image to be processed into the style model to be used, so as to obtain the style image to be used corresponding to each original image, wherein the style image to be used has different features from the initial style image corresponding to each original image to be processed.

According to one or more embodiments of the present disclosure, Example 6 provides a stylized image generation method, further including:

optionally, determining pixel point information of key points in each original image to be processed and key points in the style image to be used; and determining deformation parameters on the basis of the pixel point information, and attaching the parts to be adjusted in each original image to be processed into the style image to be used on the basis of the deformation parameters, so as to obtain the target style image.

According to one or more embodiments of the present disclosure, Example 7 provides a stylized image generation method, further including:

optionally, determining a stylization conversion model to be trained of a target grid structure; and splicing a discriminator to be trained for the stylization conversion model to be trained, and setting a parameter adjustment constraint condition for the discriminator to be trained to perform constraint adjustment on model parameters in the stylization conversion model to be trained and model parameters in the discriminator to be trained on the basis of the constraint condition, so as to obtain the target stylization conversion model.

According to one or more embodiments of the present disclosure, Example 8 provides a stylized image generation method, further including:

optionally, inputting each original image to be processed in the stylized pairing data into the stylization conversion model to be trained, so as to obtain a second actual output image;

inputting the second actual output image and the target style image in the stylized pairing data into the discriminator to be trained, so as to obtain a discrimination result;

adjusting model parameters in the stylization conversion model to be trained and model parameters in the discriminator to be trained on the basis of the discrimination result and the constraint condition; and converging a loss function in the stylization conversion model to be trained and a loss function in the discriminator to be trained as training targets, so as to obtain the target stylization conversion model.

According to one or more embodiments of the present disclosure, Example 9 provides a stylized image generation method, further including:

optionally, deploying the target stylization conversion model in a client, upon acquiring video frames to be processed, performing stylization processing on the video frames to be processed on the basis of the target stylization conversion model, so as to obtain target video frames, and then obtaining a target video on the basis of all the target video frames.

According to one or more embodiments of the present disclosure, Example 10 provides a stylized image generation apparatus, including:

a to-be-used style model determination module, configured to determine a plurality of initial pairing data, and perform training on the basis of the plurality of initial pairing data, so as to obtain a style model to be used, wherein each initial pairing data includes an original image and an initial style image obtained after the original image is processed by a 3D style generation model;

a to-be-used style image determination module, configured to determine a plurality of original images to be processed from the original images in the plurality of initial pairing data on the basis of a preset screening condition, and process each original image to be processed on the basis of the style model to be used, so as to obtain a style image to be used corresponding to each original image to be processed;

a target style image determination module, configured to perform deformation processing on the style image to be used, so as to obtain a target style image corresponding to each original image to be processed, and use each original image to be processed and the corresponding target style image as stylized pairing data; and a target stylization conversion model determination module, configured to train a stylization conversion model to be trained on the basis of the stylized pairing data, so as to obtain a target stylization conversion model, and then, upon acquiring video frames to be processed, perform stylization processing on the video frames to be processed on the basis of the target stylization conversion model, so as to obtain a processed target video.

What is claimed is:

1. A stylized image generation method, comprising:

determining a plurality of initial pairing data, and performing training on the basis of the plurality of initial pairing data to obtain a style model to be used, wherein each initial pairing data comprises an original image and an initial style image obtained after the original image is processed by a three dimensional (3D) style generation model;

determining a plurality of original images to be processed from the original images in the plurality of initial pairing data on the basis of a preset screening condition, and processing each original image to be processed on the basis of the style model to be used, so as to obtain a style image to be used corresponding to each original image to be processed;

obtaining a target style image corresponding to each original image to be processed by performing deformation processing on the style image to be used, and using each original image to be processed and the corresponding target style image as stylized pairing data; and training a stylization conversion model to be trained on the basis of the stylized pairing data to obtain a target stylization conversion model, and upon acquiring video frames to be processed, performing stylization processing on the video frames to be processed on the basis of the target stylization conversion model to obtain a processed target video.

2. The method according to claim 1, wherein determining the plurality of initial pairing data comprises:

acquiring a plurality of original images comprising facial information; and inputting each original image into a pre-trained 3D style generation model to obtain a corresponding initial style image after facial information processing.

3. The method according to claim 1, wherein performing training on the basis of the plurality of initial pairing data to obtain the style model to be used, comprises:

acquiring a first style model to be trained;

for each initial pairing data, using an original image in each initial pairing data as an input of the first style model to be trained to obtain a first output image corresponding to the original image;

determining a loss value on the basis of the first output image and the initial style image corresponding to the original image, so as to adjust model parameters in the first style model to be trained on the basis of the loss value; and converging a first loss function in the first style model to be trained as a training target to obtain the style model to be used.

4. The method according to claim 1, wherein the preset screening condition comprises that change angles of parts to be adjusted are greater than preset change angle threshold values, and wherein determining the plurality of original images to be processed from the original images in the plurality of initial pairing data on the basis of the preset screening condition comprises:

determining original images to be processed of which the change angles of the parts to be adjusted are greater than the preset change angle threshold values in the original images;

wherein the parts to be adjusted comprise five sense organs.

5. The method according to claim 1, wherein processing the plurality of original images to be processed on the basis of the style model to be used to obtain style image to be used, comprises:

inputting each original image to be processed into the style model to be used to obtain the style image to be used corresponding to each original image, wherein the style image to be used has different features from an initial style image corresponding to each original image to be processed.

6. The method according to claim 1, wherein performing deformation processing on the style image to be used to obtain the target style image corresponding to each original image to be processed, comprises:

determining pixel point information of key points in each original image to be processed and the style image to be used; and determining deformation parameters on the basis of the pixel point information, and attaching the parts to be adjusted in each original image to be processed into the style image to be used on the basis of the deformation parameters, so as to obtain the target style image.

7. The method according to claim 1, wherein the method further comprises, before training the stylization conversion model to be trained on the basis of the stylized pairing data to obtain the target stylization conversion model:

determining a stylization conversion model to be trained of a target grid structure; and splicing a discriminator to be trained for the stylization conversion model to be trained, and setting a parameter adjustment constraint condition for the discriminator to be trained to perform constraint adjustment on model parameters in the stylization conversion model to be trained and model parameters in the discriminator to be trained on the basis of the constraint condition, so as to obtain the target stylization conversion model.

8. The method according to claim 7, wherein training the stylization conversion model to be trained on the basis of the stylized pairing data to obtain the target stylization conversion model, comprises:

inputting each original image to be processed in the stylized pairing data into the stylization conversion model to be trained to obtain a second actual output image;

inputting the second actual output image and the target style image in the stylized pairing data into the discriminator to be trained to obtain a discrimination result;

adjusting model parameters in the stylization conversion model to be trained and model parameters in the discriminator to be trained on the basis of the discrimination result and the constraint condition; and converging a loss function in the stylization conversion model to be trained and a loss function in the discriminator to be trained as training targets, so as to obtain the target stylization conversion model.

9. The method according to claim 1, further comprising:

deploying the target stylization conversion model in a client, and upon acquiring video frames to be processed, performing stylization processing on the video frames to be processed on the basis of the target stylization conversion model to obtain target video frames, and obtaining a target video on the basis of all target video frames.

10. An electronic device, comprising:

a processor; and a storage apparatus, configured to store a program which when executed by the processor, causes the processor to;

determine a plurality of initial pairing data, and performing training on the basis of the plurality of initial pairing data to obtain a style model to be used, wherein each initial pairing data comprises an original image and an initial style image obtained after the original image is processed by a three dimensional (3D) style generation model;

determine a plurality of original images to be processed from the original images in the plurality of initial pairing data on the basis of a preset screening condition, and processing each original image to be processed on the basis of the style model to be used, so as to obtain a style image to be used corresponding to each original image to be processed;

obtain a target style image corresponding to each original image to be processed by performing deformation processing on the style image to be used, and using each original image to be processed and the corresponding target style image as stylized pairing data; and train a stylization conversion model to be trained on the basis of the stylized pairing data to obtain a target stylization conversion model, and upon acquiring video frames to be processed, performing stylization processing on the video frames to be processed on the basis of the target stylization conversion model to obtain a processed target video.

11. The electronic device according to claim 10, wherein the program causing the processor to determine the plurality of initial pairing data, causes the processor to:

acquire a plurality of original images comprising facial information; and input each original image into a pre-trained 3D style generation model to obtain a corresponding initial style image after facial information processing.

12. The electronic device according to claim 10, wherein the program causing the processor to perform training on the basis of the plurality of initial pairing data to obtain the style model to be used, causes the processor to:

acquire a first style model to be trained;

for each initial pairing data, using an original image in each initial pairing data as an input of the first style model to be trained to obtain a first output image corresponding to the original image;

determine a loss value on the basis of the first output image and the initial style image corresponding to the original image, so as to adjust model parameters in the first style model to be trained on the basis of the loss value; and converge a first loss function in the first style model to be trained as a training target to obtain the style model to be used.

13. The electronic device according to claim 10, wherein the preset screening condition comprises that change angles of parts to be adjusted are greater than preset change angle threshold values, and wherein the program causing the processor to determine the plurality of original images to be processed from the original images in the plurality of initial pairing data on the basis of the preset screening condition, causes the processor to:

determine original images to be processed of which the change angles of the parts to be adjusted are greater than the preset change angle threshold values in the original images;

wherein the parts to be adjusted comprise five sense organs.

14. The electronic device according to claim 10, wherein the program causing the processor to process the plurality of original images to be processed on the basis of the style model to be used to obtain style image to be used, causes the processor to:

input each original image to be processed into the style model to be used to obtain the style image to be used corresponding to each original image, wherein the style image to be used has different features from an initial style image corresponding to each original image to be processed.

15. The electronic device according to claim 10, wherein the program causing the processor to perform deformation processing on the style image to be used to obtain the target style image corresponding to each original image to be processed, causes the processor to:

determine pixel point information of key points in each original image to be processed and the style image to be used; and determine deformation parameters on the basis of the pixel point information, and attaching the parts to be adjusted in each original image to be processed into the style image to be used on the basis of the deformation parameters, so as to obtain the target style image.

16. The electronic device according to claim 10, wherein, before training the stylization conversion model to be trained on the basis of the stylized pairing data to obtain the target stylization conversion model, the program further causes the processor to:

determine a stylization conversion model to be trained of a target grid structure; and splice a discriminator to be trained for the stylization conversion model to be trained, and setting a parameter adjustment constraint condition for the discriminator to be trained to perform constraint adjustment on model parameters in the stylization conversion model to be trained and model parameters in the discriminator to be trained on the basis of the constraint condition, so as to obtain the target stylization conversion model.

17. The electronic device according to claim 16, wherein the program causing the processor to train the stylization conversion model to be trained on the basis of the stylized pairing data to obtain the target stylization conversion model, causes the processor to:

input each original image to be processed in the stylized pairing data into the stylization conversion model to be trained to obtain a second actual output image;

input the second actual output image and the target style image in the stylized pairing data into the discriminator to be trained to obtain a discrimination result;

adjust model parameters in the stylization conversion model to be trained and model parameters in the discriminator to be trained on the basis of the discrimination result and the constraint condition; and converge a loss function in the stylization conversion model to be trained and a loss function in the discriminator to be trained as training targets, so as to obtain the target stylization conversion model.

18. The electronic device according to claim 10, the program further causes the processor to:

deploy the target stylization conversion model in a client, and upon acquiring video frames to be processed, performing stylization processing on the video frames to be processed on the basis of the target stylization conversion model to obtain target video frames, and obtaining a target video on the basis of all target video frames.

19. A non-transitory storage medium, comprising computer-executable instructions, wherein the computer-executable instructions are used for, when being executed by a computer processor, causes the computer processor to:

determine a plurality of initial pairing data, and performing training on the basis of the plurality of initial pairing data to obtain a style model to be used, wherein each initial pairing data comprises an original image and an initial style image obtained after the original image is processed by a three dimensional (3D) style generation model;

determine a plurality of original images to be processed from the original images in the plurality of initial pairing data on the basis of a preset screening condition, and processing each original image to be processed on the basis of the style model to be used, so as to obtain a style image to be used corresponding to each original image to be processed;

obtain a target style image corresponding to each original image to be processed by performing deformation processing on the style image to be used, and using each original image to be processed and the corresponding target style image as stylized pairing data; and train a stylization conversion model to be trained on the basis of the stylized pairing data to obtain a target stylization conversion model, and upon acquiring video frames to be processed, performing stylization processing on the video frames to be processed on the basis of the target stylization conversion model to obtain a processed target video.

* * * * *